(12) United States Patent
Takata

(10) Patent No.: US 6,612,653 B2
(45) Date of Patent: Sep. 2, 2003

(54) RETRACTABLE HEADREST FOR SEAT ASSEMBLY

(75) Inventor: Yasuhide Takata, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/034,389

(22) Filed: Jan. 3, 2002

(65) Prior Publication Data

US 2002/0084686 A1 Jul. 4, 2002

(30) Foreign Application Priority Data

Jan. 4, 2001 (JP) .................................. 2001-000126

(51) Int. Cl.[7] ................................................ A47C 1/10
(52) U.S. Cl. ..................... 297/408; 297/391; 297/403; 297/61
(58) Field of Search ................................ 297/408, 391, 297/403, 61

(56) References Cited

U.S. PATENT DOCUMENTS

| 3,174,799 | A |   | 3/1965  | Haltenberger |         |
|-----------|---|---|---------|--------------|---------|
| 4,576,411 | A | * | 3/1986  | Kitamura     | 16/332  |
| 5,282,668 | A | * | 2/1994  | Heussner et al. | 297/238 |
| 5,364,164 | A | * | 11/1994 | Kuranami     | 297/408 |
| 5,590,933 | A | * | 1/1997  | Andersson    | 297/403 |
| 5,669,667 | A | * | 9/1997  | Schmidt      | 297/403 |
| 5,669,668 | A | * | 9/1997  | Leuchtmann   | 297/403 |
| 5,752,742 | A | * | 5/1998  | Kerner et al. | 297/391 |
| 5,816,657 | A | * | 10/1998 | Hecht et al. | 297/391 |
| 5,906,414 | A |   | 5/1999  | Rus          |         |
| 6,299,254 | B1 | * | 10/2001 | Dinh et al. | 297/403 |
| 6,302,485 | B1 | * | 10/2001 | Nakane et al. | 297/391 |

FOREIGN PATENT DOCUMENTS

| DE | 297 15 449 |   | 12/1997 |         |
|----|-----------|---|---------|---------|
| EP | 0113645   | * | 7/1984  |         |
| EP | 0 895 895 |   | 2/1999  |         |
| FR | 1579537   | * | 12/1968 | 297/357 |
| FR | 95 943    |   | 3/1972  |         |
| FR | 2 123 792 |   | 9/1972  |         |
| GB | 1 378 581 |   | 12/1974 |         |
| GB | 2037154   | * | 7/1980  | 297/408 |

* cited by examiner

Primary Examiner—Peter M. Cuomo
Assistant Examiner—Erika Garrett
(74) Attorney, Agent, or Firm—Wenderoth, Lind & Ponack, L.L.P.

(57) ABSTRACT

A retractable headrest assembly for a seat includes a headrest assembly mounted on a top portion of a seatback for pivotal movement between use and retracted positions about a first axis, and a retracting mechanism for toggling the headrest assembly to either of the use and retracted positions. The retracting mechanism includes a first shaft member defining the first axis and coupled with a seatback frame, embedded in the seatback, and a biasing element for urging the headrest assembly rearwardly about the first axis.

7 Claims, 6 Drawing Sheets

RETRACTABLE HEADREST FOR SEAT ASSEMBLY

BACKGROUND OF THE INVENTION

1. Field of the Invention

The present invention relates to a seat assembly in general and, more particularly, to a retractable headrest assembly for an automobile seat assembly although not exclusively limited thereto.

2. Description of the Related Art

In some countries over the world, seat assemblies in automotive vehicles are required by law to have a headrest for protecting one or more vehicle occupants. The headrest assembly generally in use is now available in two types, liftable and retractable types. While the liftable headrest is specifically designed to allow the position of the headrest to be adjustable to suit to the position of, for example, a vehicle driver, the currently available retractable headrest is of a structure employed in combination with a pivot or retracting mechanism by which the headrest can be pivoted forwards or rearwards between a use position and a retracted position in which the headrest is accommodated inside the seatback.

In this known retractable headrest assembly, the retracting mechanism makes use of a combination of at least one spring element with a damping device, or an electrically driven motor. In addition, installation of the known retractable headrest assembly requires a relatively large space so as to hinder the field of view from a rear seat occupant and also to increase the weight and cost of the seat assembly as a whole.

SUMMARY OF THE INVENTION

Accordingly, the present invention has been devised to substantially eliminate the foregoing problems and inconveniences and is intended to provide a lightweight, inexpensive retractable headrest assembly employing an improved retracting mechanism effective to provide a relatively large field of view while neatly accommodated within the seatback.

In order to accomplish the foregoing and other objects and features of the present invention, there is provided a retractable headrest assembly for a seat, which includes a headrest assembly mounted on a top portion of a seatback for pivotal movement between use and retracted positions about a first axis; and a retracting mechanism for toggling the headrest assembly to either of the use and retracted positions. The retracting mechanism includes a first shaft member defining said first axis and coupled with a seatback frame, embedded in the seatback, and a biasing means for urging the headrest assembly rearwardly about the first axis.

In a preferred form of embodiment of the present invention, the retractable headrest assembly for use in a seatback includes a headrest having a frame structure embedded therein and having two spaced apart connecting portions. The seatback has a top portion formed with a recess configured to represent a shape substantially complemental to a shape of the headrest, so that when the headrest is in a retracted position, the headrest can be neatly accommodated within the recess. The headrest assembly may also include generally elongated connecting members each coupled at one end with a corresponding seatback frame embedded in the seatback so as to extend generally transverse to the associated seatback frame and axially aligned with each other to define a common axis and positioned on respective opposite sides of the recess, generally ring-shaped stop plates each rigidly secured to the respective connecting member so as to lie in a plane perpendicular to the connecting member, a bearing rod having its opposite ends coupled with the stop plates so as to extend parallel to, but be offset a distance from the common axis, and support plates pivotally mounted on the bearing rod and fixedly coupled with the connecting portions of the frame structure embedded in the headrest for movement together therewith. At least one biasing element is used and is connected between one of the support plates and one of the connecting members for retaining the headrest in one of use and retracted positions about the bearing rod. This biasing element is operable to allow the headrest to be toggled to either of the use and retracted positions as the headrest is pivoted about the bearing rod moves past a top dead center position defined on one side of the bearing rod opposite to the common axis.

BRIEF DESCRIPTION OF THE DRAWINGS

The present invention will become readily understood from the following description of preferred embodiments thereof made with reference to the accompanying drawings, in which like parts are designated by like reference numerals and in which.

DETAILED DESCRIPTION OF THE PREFERRED EMBODIMENTS

This application is based on an application No. 2001-126 filed Jan. 4, 2001 in Japan, the content of which is herein expressly incorporated by reference in its entirety.

Figure 1:
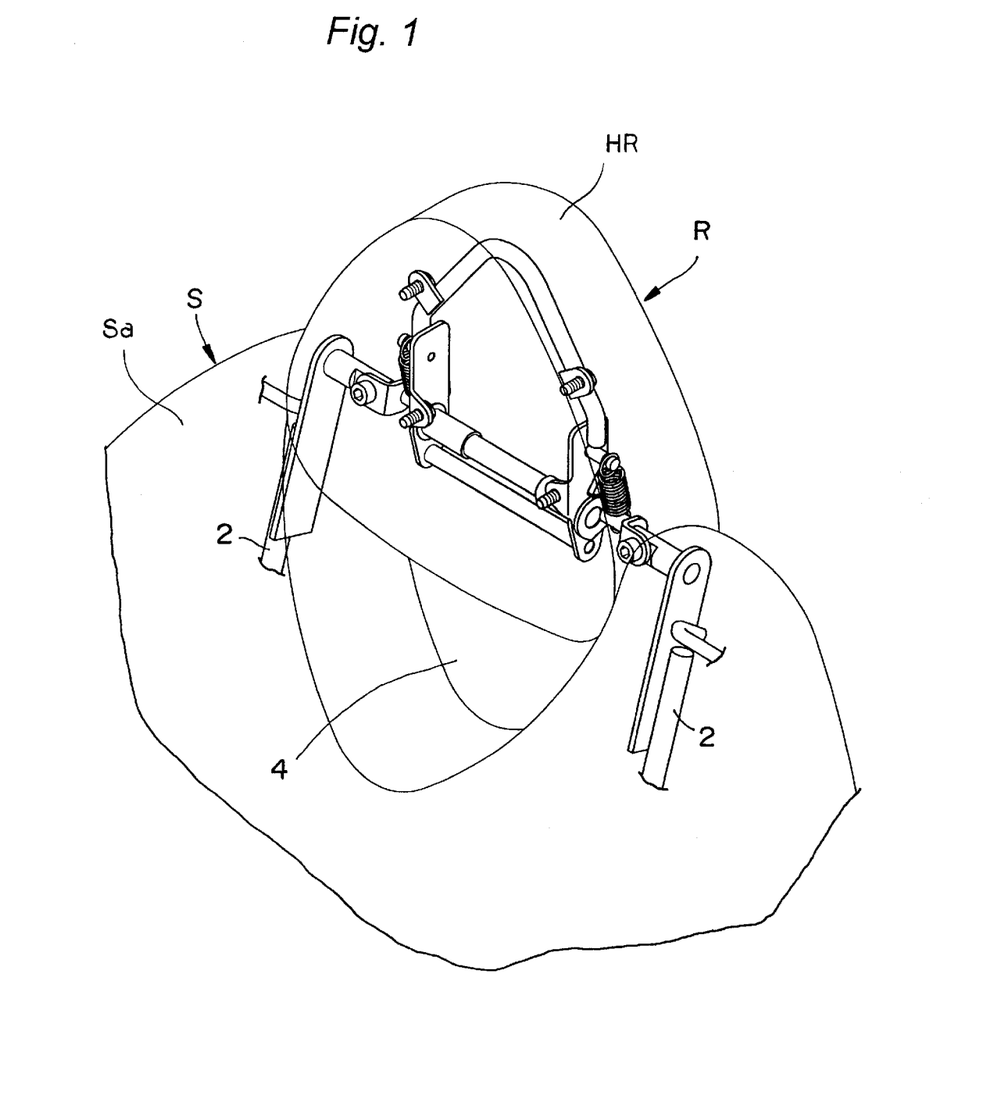
FIG. 1 is a fragmentary perspective view of a seatback employing a retractable headrest assembly designed in accordance with the present invention, with a headrest held at a use position.
Figure 2:
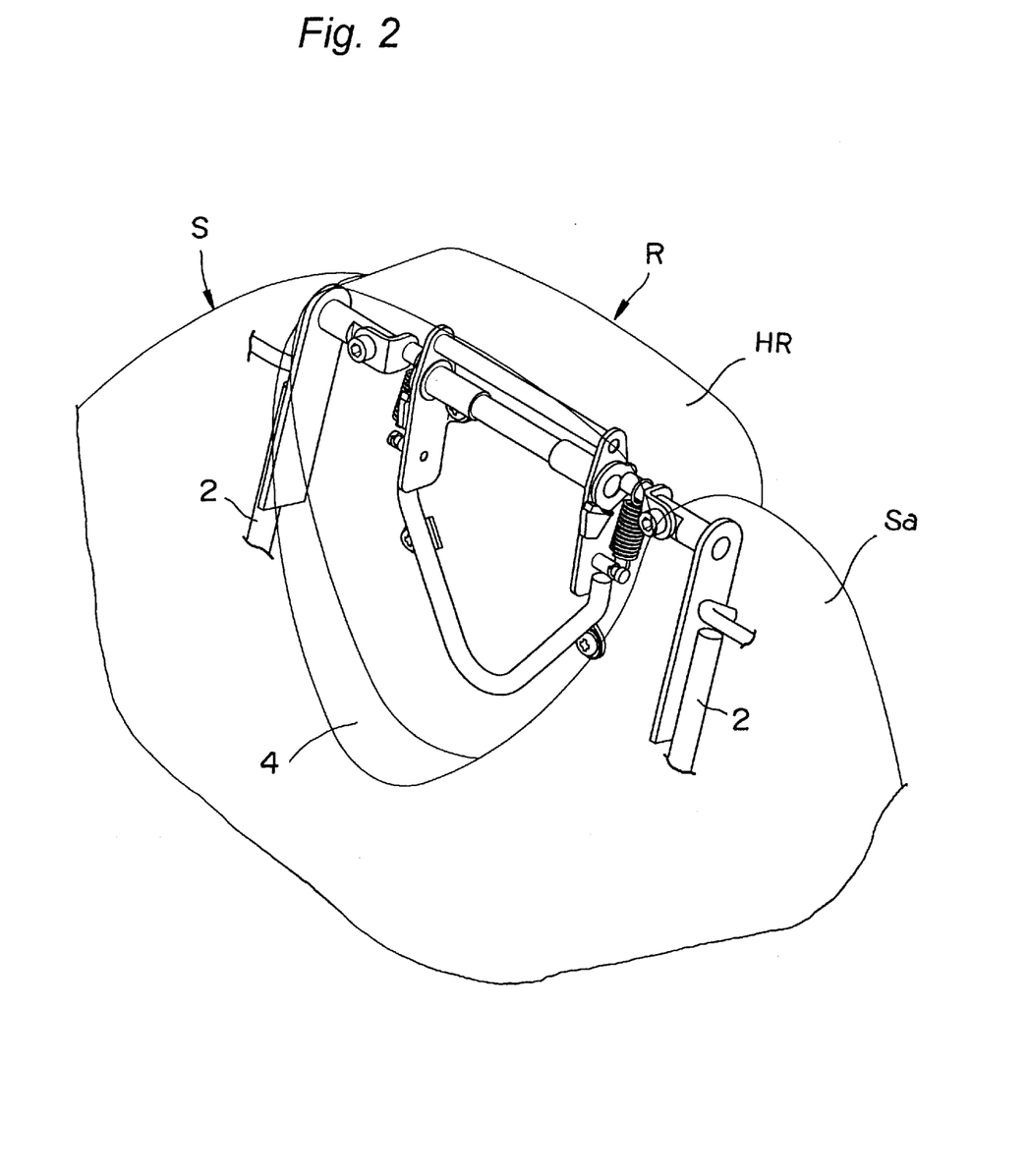
FIG. 2 is a view similar to FIG. 1, showing the headrest held at a retracted position.

Referring first to FIGS. 1 and 2, there is shown a retractable headrest assembly R according to the present invention. The headrest assembly R is shown as used in an automobile seat assembly including a seatback S, but may be employed in any other seat such as, for example, a home reclining chair such as a lounger. As will be readily understood from the subsequent description, the retractable headrest assembly R according to the present invention does neither make use of an electrical installation nor any connection with an external actuating mechanism and, accordingly, the retractable headrest assembly R of the present invention can be employed in any type of seats or chairs that may be used where neither electric power nor an external drive source is available.

The retractable headrest assembly R embodying the present invention includes a headrest HR pivotable between a use position as shown in FIG. 1 and a retracted position as shown in FIG. 2 by means of the retracting mechanism generally identified by M. In FIGS. 1 and 2, the seatback S is shown to have its top portions formed with a recess 4 leaving a pair of shoulder supports Sa on respective sides thereof. As will become clear from the subsequent description, seatback support frames 2 connected at one end with, for example, seat cushion frames (not shown) or frame elements of any known seatback reclining adjustment (also not shown) extend to such an extent as to terminate within the shoulder supports Sa.

The headrest HR is shown to be of a generally triangular configuration and, hence, the recess 4 may have a correspondingly triangular configuration complemental to the shape of the headrest HR so that when the headrest HR is pivoted to the retracted position the headrest HR can be snugly and neatly accommodated within the recess 4, although any other combination of shapes of the headrest HR and the recess 4 can be employed. It is, however, to be noted that the headrest assembly R embodying the present invention may be combined with any known headrest lift mechanism, but where no headrest lift mechanism is employed, the triangular shape of the headrest R such as shown is particularly advantageous in that when the headrest R is pivoted to the use position as shown in FIG. 1, a vertex portion of the headrest R can come to a position generally aligned with the head of a seat occupant.

Figure 3:
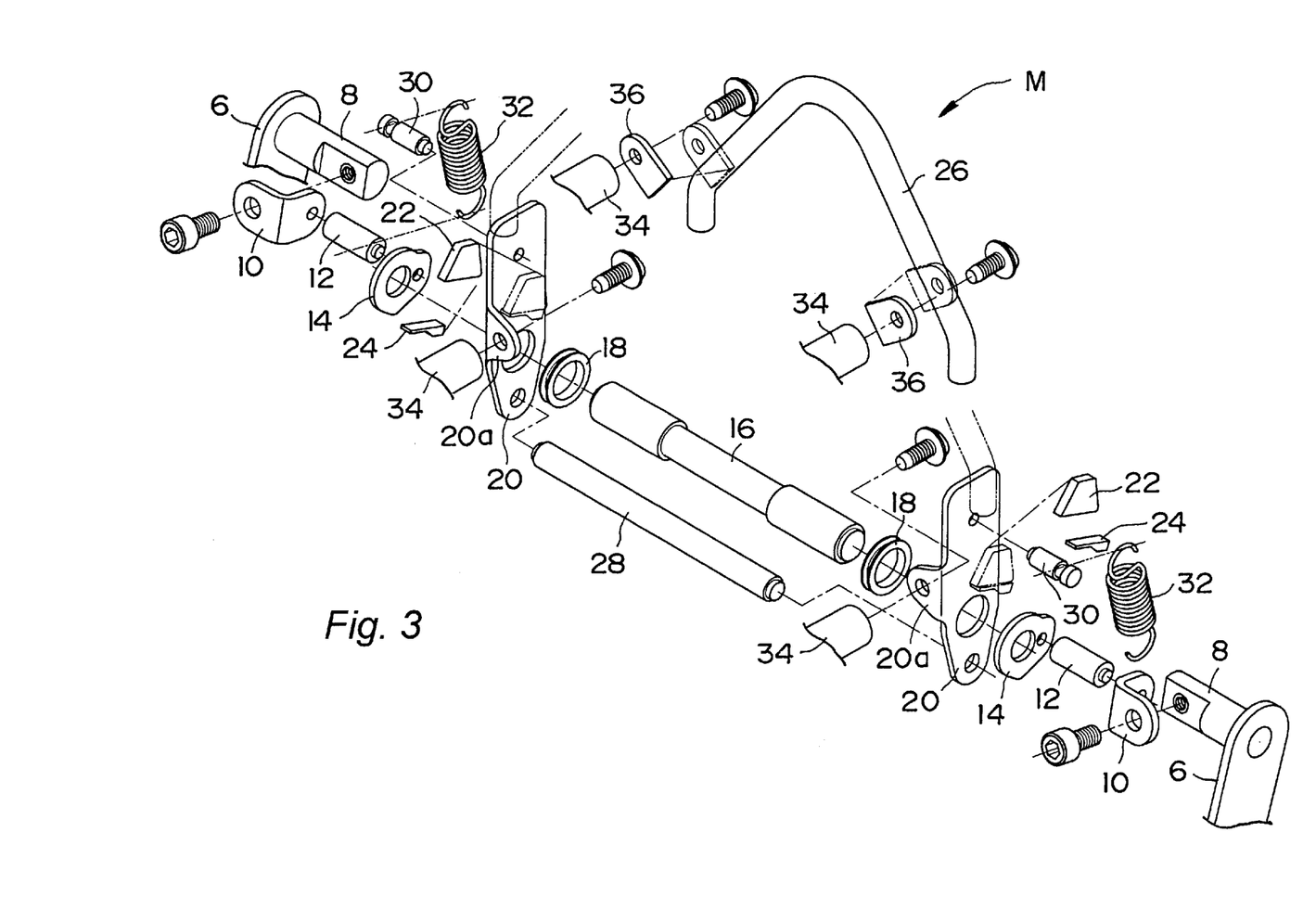
FIG. 3 is an exploded view of a retracting mechanism shown in FIGS. 1 and 2.
Figure 4:
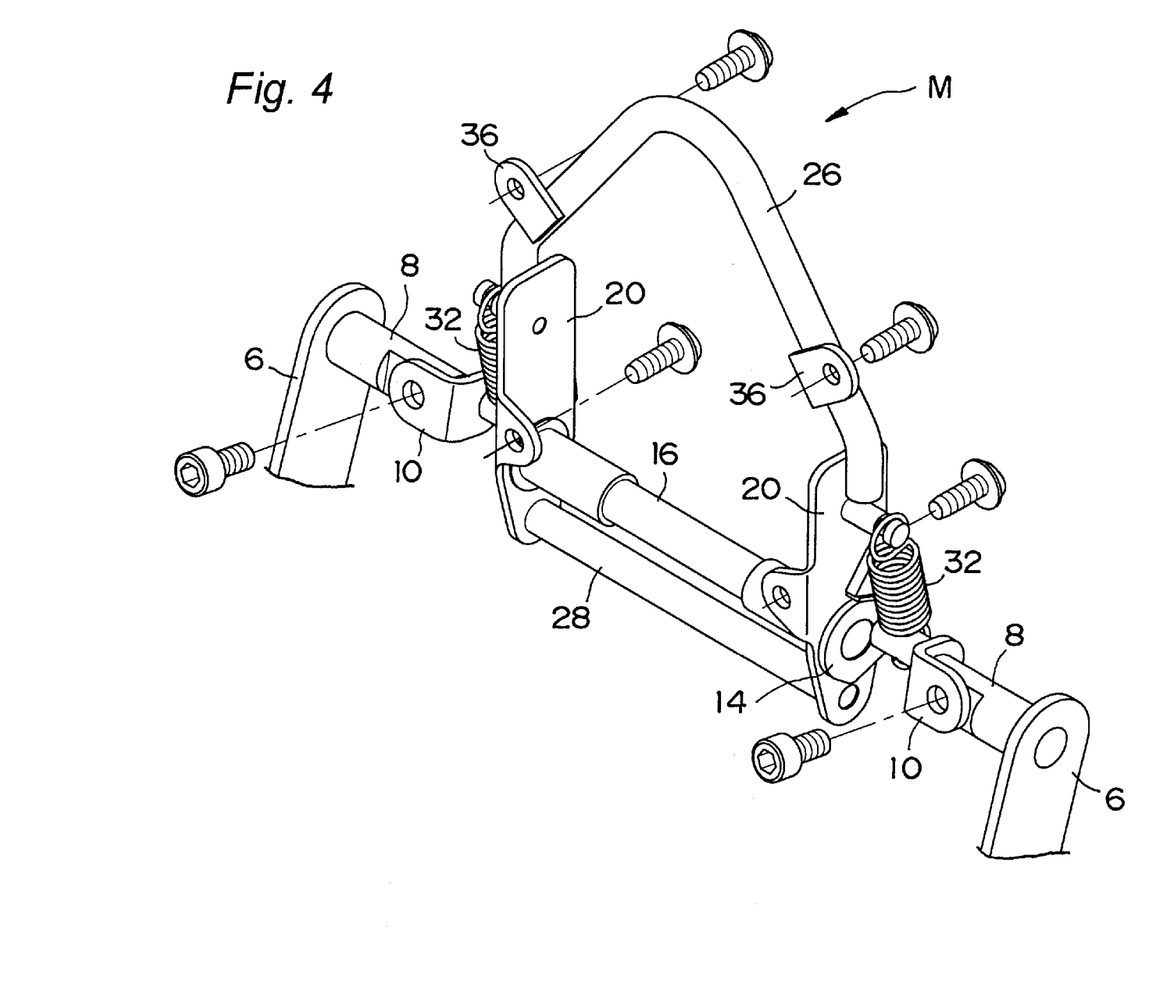
FIG. 4 is a perspective view of the retracting mechanism showing the skeleton thereof when the headrest is held at the use position.
Figure 5:
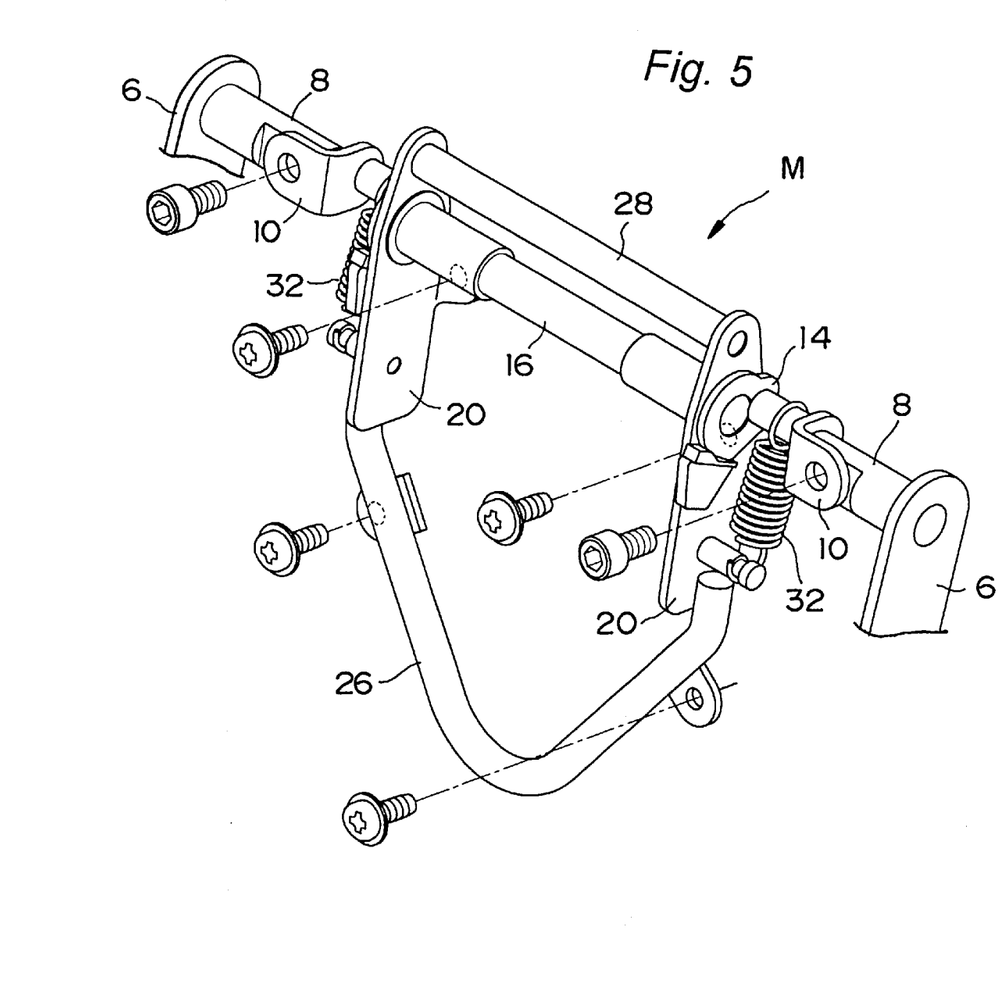
FIG. 5 is a view similar to FIG. 5, showing the skeleton of the headrest assembly when the headrest is held at the retracted position.

Referring particularly to FIGS. 3 to 5, respective top ends of the seatback support frames 2 may have headrest support bars 6 rigidly connected thereto, respectively, so as to extend further upwardly within the associated shoulder supports Sa. Each of the headrest support bars 6 has a transverse support rod 8 fixed at one end to the corresponding headrest support bar 6 so as to extend perpendicular thereto and also so as to face towards and be axially aligned with the transverse support rod 8 secured to the other of the headrest support bars 6. It is to be noted that the headrest support bars 6 may be dispensed with, in which case the transverse support rods 8 are to be fixedly connected to the seatback support frames 2 so as to extend perpendicular thereto.

A generally L-shaped bracket 10 having a fixing arm and a bearing arm at right angles to the fixing arm is mounted on each of the headrest support rods 8 with the fixing arm secured thereto by means of a set bolt. A generally annular stopper plate 14 is secured to the bearing arm of each bracket 10 through an associated connecting pin 12. The annular stopper plates 14 carried by the transverse support rods 8 in the manner described above are oriented in the same direction with their bores aligned with each other in a direction traversing the recess 4. Although in the illustrated embodiment the transverse support rods 8, and the connecting pins 12 separate therefrom are employed, each connecting pin 12 may be an integral part of the associated transverse rod 8 and may hence be defined by a single rod member.

The retracting mechanism M also includes a pair of generally rectangular side plates 20 and a bearing rod 16. Each of the rectangular side plates 20 has a bearing hole defined therein at a location adjacent one end thereof, and the bearing rod 16 has its opposite ends extending through the bearing holes in the side plates 20 and axially immovably received in the bores of the stopper plates 14, respectively. A washer 18 may be interposed between an annular shoulder at each end portion of the bearing rod 16 and the adjacent side plate 20. The bearing rod 16 has its longitudinal axis positioned offset a distance laterally from a common axis connecting between the connecting pins 12 for a reason which will become clear from the subsequent description.

Figure 6:
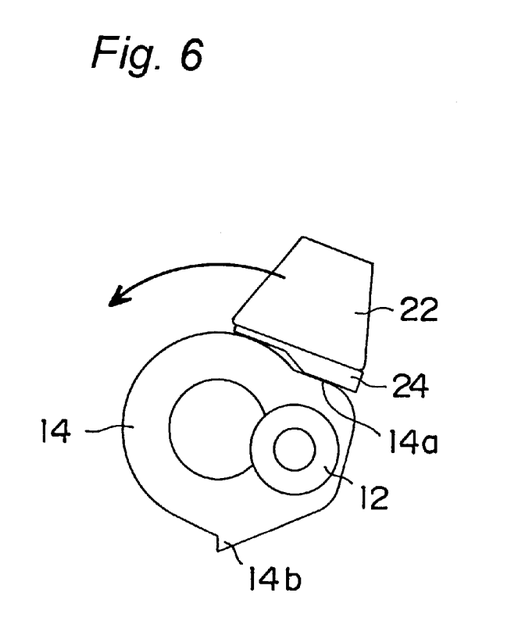
FIG. 6 is a schematic side view of a portion of the retracting mechanism, showing an engagement between a stopper plate and a stopper bracket.

In order to define the use and retracted positions of the headrest HR. a stopper piece 22 is fixedly mounted on, or otherwise welded to, one of opposite surfaces of each side plate 20 adjacent the corresponding annular stopper plate 14. This stopper piece 22 is cooperable with the corresponding annular stopper plate 14 and, for this purpose, has a bottom face slidingly engaged with a portion of the outer peripheral edge of the annular stopper plate 14 substantially as best shown in FIG. 6. As shown, a rubber piece 24 is bonded to the bottom face of each stopper piece 22, which may not be always necessary.

The side plates 20 are connected together by means of a generally V-shaped upper headrest frame 26 having its opposite ends welded to respective upper ends thereof and a lower headrest frame 28 having its opposite ends received and fixed in position within respective holes each defined in the lower end of the associated side plate 20 so as to extend substantially parallel to the bearing rod 16. The assembly including the side frames 20 and the upper and lower headrest frames 26 and 28 is pivotable about the bearing rod 16 between two positions corresponding to the use and retracted positions of the headrest HR. For enabling the headrest HR to be toggled between the use and retracted positions, biasing elements such as coil springs 32 are employed and each has one end anchored to the adjacent connecting pin 12 and the other anchored to an associated anchor pin 30. Each anchor pin 30 is secured to one of the side plates 20 at a location on one side of the stopper piece 22 opposite to the bearing hole so as to protrude laterally towards the adjacent transverse support rod 6.

It will readily be seen that since the longitudinal axis of the bearing rod 16 is offset laterally from the common axis aligned with the connecting pins 12, the assembly including the side frames 20 and the upper and lower headrest frames 26 and 28 can be toggled to the use position or the retracted position by the action of the coil springs 32 while pivoting about the longitudinal axis of the bearing rod 16.

More specifically, assuming that the headrest HR is in the use position as shown in FIGS. 1 and 4, the stopper pieces 22 are, having been pulled by the coil springs 32, held in abutment with radially outward protrusion 14a integral with the respective annular stopper plates 14 as best shown in FIG. 6 and, therefore, the headrest HR cannot go beyond the use position. When the headrest HR is pivoted counterclockwise about the bearing rod 16 against the coil springs 32 in readiness for the headrest HR to be accommodated neatly within the recess 4 by the application of an external pushing or pulling force acting in a forward direction confronting the position of the head of the seat occupant, and as the headrest HR passes over a top dead center position, the headrest HR can be quickly toggled over the top dead center position and then folded into the recess 4 by the action of the coil springs 32. The dead center position referred to above is defined at a location on one side of the bearing rod 16 opposite to the common axis aligned with the connecting pins 12, at which the coil springs 32 are axially outwardly expanded to accumulate respective energies necessary to toggle the headrest HR in the manner described above.

When the headrest HR is so pivoted to the retracted position as shown in FIGS. 2 and 5, the stopper pieces 22 are brought into engagement with radially outwardly protruding stops 14b, as shown in FIG. 6, each integral with the corresponding stopper plate 14, and are kept in that retracted position by the action of the coil springs 32.

In practice, the assembly including the side frames 20, the upper and lower headrest frames 26 and 28, the bearing rod 16, the coil springs 32, and the brackets 10 is concealed within a casing (not shown) embedded in the headrest HR.

The casing may include casing halves of identical configuration made of a suitable synthetic resin. At least one of the casing halves may have a plurality of interior ribs 34, some of which may be utilized for connection with fixture lugs 20a, formed integrally with the side plates 20 so as to protrude transverse thereto, and fixture brackets 36 welded to the V-shaped headrest frame 26. After such one of the casing halves has been connected to the assembly, the other of the casing halves may be welded, or otherwise bonded or screwed, to such one of the casing halves and the resultant casing is then embedded in a cushioning material to finish the headrest HR.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A retractable headrest assembly for a seat, comprising:

a headrest assembly mounted on a top portion of a seatback for pivotal movement between use and retracted positions about a first axis; and a retracting mechanism for toggling the headrest assembly to either of the use and retracted positions, said retracting mechanism including a first shaft member defining said first axis and coupled with a seatback frame, embedded in the seatback, and a biasing mechanism for urging the headrest assembly rearwardly about the first axis;

wherein the retracting mechanism includes a pair of generally elongated support plate members pivotably mounted on opposite end portions of the first shaft member, the headrest assembly being mounted on the support plate members, and a second shaft member connected with the seatback frame and extending at a location laterally offset from the first shaft member, wherein the biasing mechanism includes a coil spring having one end anchored to a portion of one of the support plate members and the other end anchored to the second shaft member whereby the headrest assembly is biased rearwardly at all times by the coil spring.

2. The retractable headrest assembly as claimed in claim 1, further comprising a pair of stopper plates each mounted on the second shaft member and having first and second stop protrusions defined therein, the first shaft member having its opposite ends connected with the respective stopper plates, and a stopper piece rigidly secured to one of the support plate members and slidingly engageable with a peripheral edge of one of the stopper plates, the headrest assembly being held at the use position when the stopper piece is brought into abutment with the first stop protrusion, but held at the retracted position when the stopper piece is brought into abutment with the second stop protrusion.

3. A retractable headrest assembly for use in a seatback, comprising:

a headrest having a frame structure embedded therein, said frame structure having two spaced apart connecting portions, the headrest being supported for angular movement between use and retracted positions;

the seatback having a top portion formed with a recess configured to represent a shape substantially complemental to a shape of the headrest, said recess accommodating the headrest neatly therein when the headrest is moved to the retracted position;

generally elongated connecting members each coupled at one end with a corresponding seatback frame embedded in the seatback so as to extend generally transverse to the associated seatback frame, the elongated connecting members being axially aligned with each other to define a common axis and positioned on respective opposite sides of the recess;

generally ring-shaped stop plates each rigidly secured to the respective connecting member so as to lie in a plane perpendicular to the connecting member;

a bearing rod having its opposite ends coupled with the stop plates so as to extend parallel to, but be offset a distance from the common axis;

support plates pivotally mounted on the bearing rod and fixedly coupled with the connecting portions of the frame structure embedded in the headrest for movement together therewith; and at least one biasing element connected between one of the support plates and one of the connecting members for retaining the headrest in one of the use and retracted positions about the bearing rod, said biasing element allowing the headrest to be toggled to either of the use and retracted positions as the headrest is pivoted about the bearing rod and moves past a top dead center position defined on one side of the bearing rod opposite to the common axis.

4. A retractable headrest assembly for a seat, comprising:

a headrest assembly mounted on a top portion of a seatback having a headrest-accommodating recess therein, said headrest assembly being mounted for pivotal movement about a first axis between a retracted position, in which said headrest assembly is accommodated in said headrest-accommodating recess, and a use position; and a retracting mechanism for toggling the headrest assembly to either of the use and retracted positions, said retracting mechanism including a first shaft member defining said first axis and coupled with a seatback frame, embedded in the seatback, and a biasing mechanism for urging the headrest assembly rearwardly about the first axis;

wherein said headrest-accommodating recess has a shape complemental to a shape of said headrest assembly, wherein the retracting mechanism includes a pair of generally elongated support plate members pivotably mounted on opposite end portions of the first shaft member, the headrest assembly being mounted on the support plate members, and a second shaft member connected with the seatback frame and extending at a location laterally offset from the first shaft member, and wherein the biasing mechanism includes a coil spring having one end anchored to a portion of one of the support plate members and the other end anchored to the second shaft member whereby the headrest assembly is biased rearwardly at all times by the coil spring.

5. The retractable headrest assembly as claimed in claim 4, further comprising a pair of stopper plates each mounted on the second shaft member and having first and second stop protrusions defined therein, the first shaft member having its opposite ends connected with the respective stopper plates, and a stopper piece rigidly secured to one of the support plate members and slidingly engageable with a peripheral edge of one of the stopper plates, the headrest assembly being held at the use position when the stopper piece is brought into abutment with the first stop protrusion, but held at the retracted position when the stopper piece is brought into abutment with the second stop protrusion.

6. A retractable headrest assembly for a seat, comprising:

a headrest assembly configured to be mounted on a top portion of a seatback for pivoting between use and retracted positions about a first axis; and a retracting mechanism for toggling the headrest assembly to either of the use and retracted positions, said retracting mechanism including a first shaft member defining said first axis and configured to be coupled with a seatback frame, embedded in the seatback, and a biasing mechanism for urging the headrest assembly in a first direction about the first axis;

wherein the retracting mechanism includes a pair of generally elongated support plate members pivotably mounted on opposite end portions of the first shaft member, the headrest assembly being mounted on the support plate members, and a second shaft member configured to be connected with the seatback frame and extending at a location laterally offset from the first shaft member, wherein the biasing mechanism includes a coil spring having one end anchored to a portion of one of the support plate members and the other end anchored to the second shaft member whereby the headrest assembly is biased in said first direction at all times by the coil spring.

7. The retractable headrest assembly as claimed in claim 6, further comprising a pair of stopper plates each mounted on the second shaft member and having first and second stop protrusions defined therein, the first shaft member having its opposite ends connected with the respective stopper plates, and a stopper piece rigidly secured to one of the support plate members and slidingly engageable with a peripheral edge of one of the stopper plates, the headrest assembly being held at the use position when the stopper piece is brought into abutment with the first stop protrusion, but held at the retracted position when the stopper piece is brought into abutment with the second stop protrusion.

* * * * *